United States Patent [19]
Shell et al.

[11] 3,788,037
[45] Jan. 29, 1974

[54] SEPARATION PROCESS

[76] Inventors: Don C. Shell, 4709 Chad Dr.; David A. Tanner, Rt. 4, Columbia Dr.; Ronald D. Brazzel, 308 Vicksburg, all of Tyler, Tex. 75701

[22] Filed: June 28, 1971

[21] Appl. No.: 157,234

[52] U.S. Cl. .................................................. 55/58
[51] Int. Cl. ............................................ B01d 53/04
[58] Field of Search ......... 55/58, 62, 68, 74, 75, 179

[56] References Cited
UNITED STATES PATENTS

| | | | |
|---|---|---|---|
| 3,176,444 | 4/1965 | Kiyonaga | 55/58 |
| 3,323,288 | 6/1967 | Cheung et al. | 55/58 |

*Primary Examiner*—Charles N. Hart
*Attorney, Agent, or Firm*—John G. Premo; James F. Lambe; Edward J, Mooney

[57] ABSTRACT

A continuous process for separating a gaseous mixture into a primary gaseous product stream and a secondary gaseous product stream utilizing four adsorbent-containing beds is disclosed.

10 Claims, 1 Drawing Figure

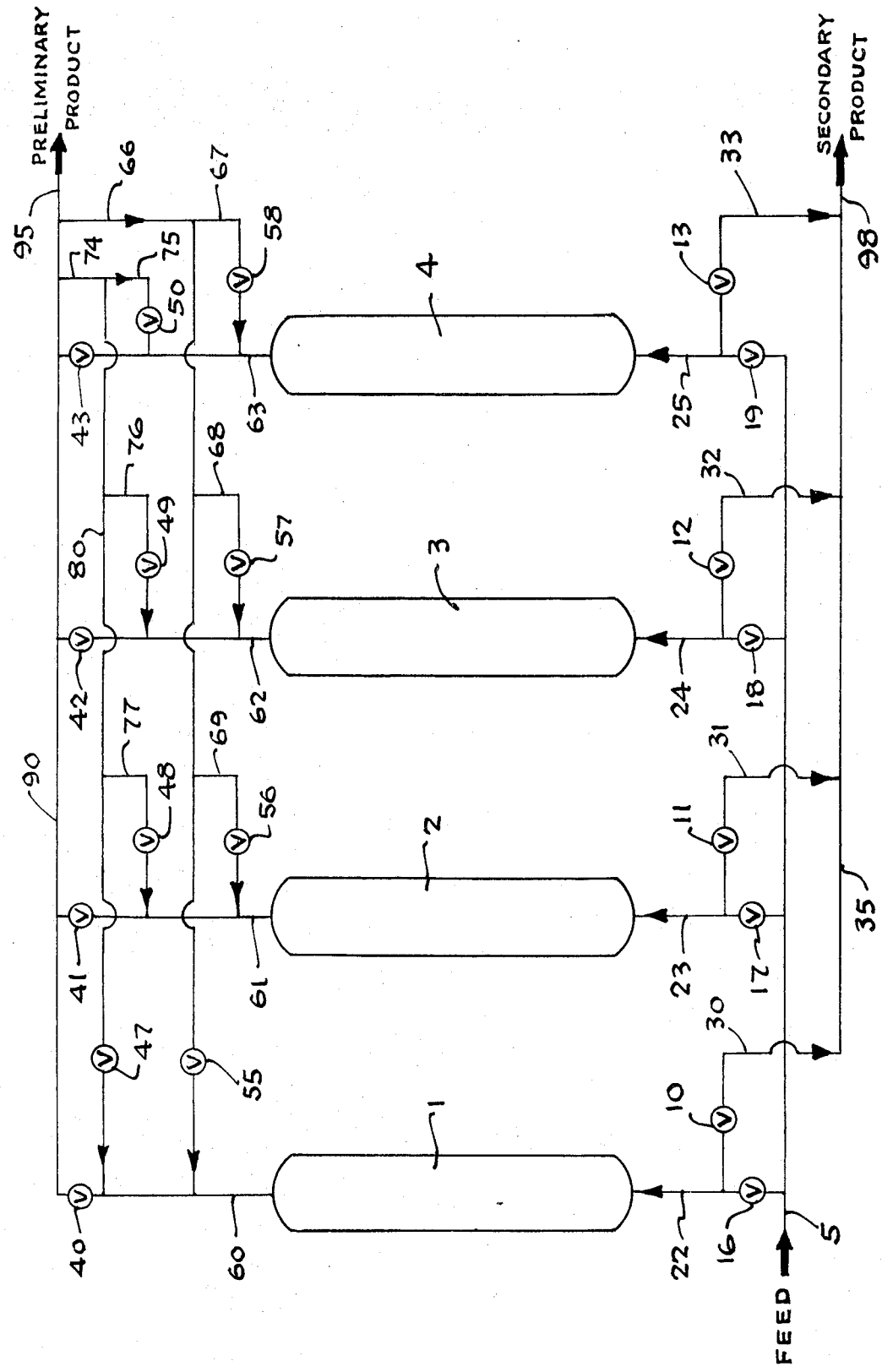

SEPARATION PROCESS

BACKGROUND OF THE INVENTION

The present invention relates to processes for separating a gaseous mixture into a primary gaseous product stream and a secondary gaseous product stream. More specifically, it is concerned with specific processing steps necessary to enable economical separation of gaseous mixtures utilizing absorbents.

There are many patents issued which are directed to various processing schemes for separating fluids into different components using absorbents; e.g. U. S. Pat. Nos. 2,944,627; 3,101,261; 3,102,013; 3,104,162; 3,138,439; 3,142,547; 3,155,741; 3,176,444; 3,176,445; 3,212,236; 3,225,518; 3,237,377; and 3,252,268.

SUMMARY OF THE INVENTION

A new processing sequence for separating gaseous mixtures into primary gaseous product streams and secondary gaseous product streams has now been found. This processing sequence, which utilizes four adsorbent-containing beds, allows continuous and economical separation of gaseous mixtures by employing specific interrelated processing steps that are performed simultaneously during successive cycle periods.

The invention may be better understood from the following description when it is read in conjunction with the drawing which is a schematic illustration of a particular processing sequence for the practice thereof.

Referring now to the drawing, therein is shown specific apparatus for continuously separating a gaseous mixture fed through line 5 and continuously removing from said apparatus a primary gaseous product stream and a secondary gaseous product stream through lines 95 and 96, respectively. Four adsorbent-containing beds, 1, 2, 3, and 4, contain adsorbent which is preferentially selective for the secondary gaseous product over the primary gaseous product. The processing sequence of the present invention comprises four specific steps which are performed simultaneously during a cycle period and are shifted and repeated during successive cycle periods in a manner such that the step performed on vessel 1 during a particular cycle period will be performed on vessel 4 during the next cycle period; the step performed on vessel 2 during a particular cycle period will be performed on vessel 1 during the next cycle period; the step performed on vessel 3 during a particular cycle period will be performed on vessel 2 during the next cycle period; and the step performed on vessel 4 during a particular cycle period will be performed on vessel 3 during the next cycle period.

At the start of a particular cycle period, valve 16 opens and the gaseous mixture is fed into vessel 1 through line 5, line 22 and open valve 16 at a selected relatively high pressure. During this cycle period, valves 17, 18 and 19 are closed to prevent flow of gaseous mixture into vessels 2, 3 and 4, and valve 10 is closed to prevent flow of gaseous mixture through line 30. Because of the preferential adsorbent, primary gaseous product flows from vessel 1 through line 60 and open valve 40 at the selected relatively high pressure into line 90 throughout the cycle period. Valves 47 and 55 as well as valves 41, 42 and 43 are closed throughout the cycle period.

Simultaneously with the adsorption step performed on vessel 1, a depressurization step is performed on vessel 2, which vessel has during the preceding cycle period undergone the adsorption step just described above for vessel 1. As the depressurization step on vessel 2, valve 11 opens at the start of the particular cycle period to release the pressure on vessel 2 from the selected relatively high pressure (which exists as a result of the adsorption step performed during the preceding cycle period) to a selected relatively low pressure. During this cycle period, valves 41, 48, 56 and 17 are closed to permit discharge of most of the secondary product (which was adsorbed during the preceding cycle period) from vessel 2 through line 23, line 31, open valve 11 and into line 35. This depressurization step occurs throughout the cycle period.

Simultaneously with the adsorption step performed on vessel 1 and the depressurization step performed on vessel 2, a purge step is performed on vessel 3, which vessel has during the preceding cycle period undergone the depressurization step just described above for vessel 2. As the purge step on vessel 3, valve 49 opens at the start of the particular cycle period to allow a portion of the primary gaseous product produced in vessel 1 to flow through line 60, open valve 40, through line 90, through line 74, through line 80, through line 76 and open valve 49 through line 62 and into vessel 3. During this particular cycle period, valves 50, 48, 47 and 57 are closed to enable flow of primary gaseous product from vessel 1 to vessel 3. The primary product flows through vessel 3 and carries with it substantially all of the secondary gaseous product remaining in vessel 3 after the depressurization step which occurred during the preceding cycle. This stream leaves vessel 3 through line 24, line 32, open valve 12 and continues with the depressurization stream in line 35 to be discharged through line 96 as the secondary product. This purge step is conducted throughout the cycle period.

Simultaneously, with the adsorption, depressurization and purge steps being performed on vessels 1, 2, and 3 respectively, a repressurization step is performed on vessel 4, which vessel during the preceding cycle period has undergone the purge step just described above for vessel 3. As the purge step on vessel 4, valve 58 opens at the start of the particular cycle period to allow another portion of the primary gaseous product produced in vessel 1 to flow through line 60, open valve 40, through line 90, through lines 66 and 67, through open valve 58, and into vessel 4 through line 63. During this cycle period, valves 55, 56 and 57 are closed to enable flow of a portion of primary product from vessel 1 to vessel 4. The primary product flowing into vessel 4 serves to repressurize the vessel from the selected relatively low pressure to the selected relatively high pressure during the cycle period because valves 19 and 13 are closed, as are valves 43 and 50.

As can be seen, during a particular cycle period, a portion of primary product produced from one vessel is used for purge through another vessel and yet another portion of primary product produced from the same vessel is used to repressurize still another vessel. The remaining vessel not involved in those steps is undergoing a depressurization step which lasts essentially throughout the cycle period, as do all the other steps. Of course, the portion of primary product discharged from vessel 1 which is not used for purge or repressurization is removed from the system through line 95 as product.

At the end of the cycle period described above, valve 16 and valve 40 close and a new cycle period begins as valve 10 opens simultaneously. Thus, the valving surrounding vessel 1 is all closed at the start of the new cycle period with the exception of valve 10. As can be seen, vessel 1 is (during the new cycle period) now undergoing the depressurization step just completed by vessel 2 during the preceding cycle period.

Simultaneously with the opening and closing of the valves surrounding vessel 1, the valves surrounding vessel 4 undergo the following: valve 19 opens, valve 13 remains closed, valve 58 closes, valve 50 remains closed and valve 43 opens; the valves surrounding vessel 3 undergo the following: valve 18 remains closed, valve 12 closes, valve 57 opens, valve 49 closes, and valve 42 remains closed; and the valves surrounding vessel 2 undergo the following: valve 17 remains closed, valve 11 remains open, valve 56 remains closed, valve 48 opens and valve 41 remains closed. Thus, with the valving positions above described, vessel 4 is undergoing adsorption, vessel 1 is undergoing depressurization, vessel 2 is undergoing purge with primary product produced from vessel 4 and vessel 3 is undergoing repressurization with primary product produced from vessel 4.

Successive cycles are conducted in the above described manner with the specific steps being shifted from vessel to vessel as the cycle periods occur. Thus, as described, the invention is a continuous process for separating a gaseous mixture into a primary gaseous product stream and a secondary gaseous product stream utilizing four adsorbent-containing beds, each of which is preferentially selective for said secondary product and each of which has a first end and a second end, said process comprising the following steps (a) through (d) which are performed simultaneously during a cycle period, said steps being shifted and repeated during each successive cycle period so that the bed which completes step (a) during a particular cycle period will complete step (b) during the next cycle period, the bed which completes step (b) during a particular cycle period will complete step (c) during the next cycle period, the bed which completes step (c) during a particular cycle period will complete step (d) during the next cycle period, and the bed which completes step (d) during a particular cycle period will complete step ( a) during the next cycle period, said steps (a) through (d) being thereby repeated during successive cycle periods and being as follows during a particular cycle period:

a. at the start of a cycle period, flowing said gaseous mixture at a selected relatively high pressure through a first adsorbent-containing bed, which bed has during the preceding cycle period completed step (d) below, from the first end to the second end thereof whereby as the cycle period continues the secondary product is retained within said first bed and the primary product is discharged from the second end of said first bed and then terminating the flow of said gaseous mixture at the end of the cycle period; and b. at the start of a cycle period, releasing the pressure on the first end of a second adsorbent-containing bed, which bed has during the preceding cycle period completed step (a) above, in a manner such that the selected relatively high pressure is gradually released throughout the cycle period to a selected relatively low pressure and whereby most of the secondary gaseous product retained in said second bed is discharged from the first end of said second bed; and c. at the start of a cycle period, flowing a portion of the primary gaseous product which is discharged from the second end of said first bed directly from said first bed through a third adsorbent-containing bed, which bed has during the preceding cycle period completed step (b) above, at the selected relatively low pressure from the second end to the first end of said third bed and continuing said flow throughout the cycle period whereby substantially all of the secondary gaseous product is removed from said third bed and then terminating said flow at the end of the cycle period; and d. at the start of a cycle period, flowing another portion of the primary gaseous product which is discharged from the second end of said first bed directly from said first bed into the second end of a fourth adsorbent-containing bed, which bed has during the preceding cycle period completed step (c) above, in a manner such that the pressure within said fourth bed is gradually raised throughout the cycle period from the selected relatively low pressure to the selected relatively high pressure and then terminating said flow at the end of the cycle period.

The gaseous mixture to be separated can be any gaseous mixture which one desires to separate into separate streams, e.g. typical gaseous mixtures which can be separated include air to produce an oxygen-rich stream and a nitrogen-rich stream; gaseous mixtures resulting from hydroforming operations on coke, cracked, or virgin naphthas or the like to produce hydrogen-rich recycle gas as a primary product; gaseous mixtures resulting from steam-hydrocarbon reforming operations to produce ultra-pure hydrogen (i.e. 99.999 + % $H_2$, by volume) as a primary gaseous product; gaseous streams composed primarily of hydrocarbons to produce a stream rich in one or more desired components and gaseous mixtures containing at least sixty percent hydrogen, with lesser amounts of primarily methane, carbon monoxide and carbon dioxide, by volume, to produce an essentially pure hydrogen primary gaseous product.

Depending upon the type of adsorbent used, the cycle times, the pressures involved and whether or not heat is added to the system, the present invention can be utilized to process virtually any gaseous mixture including those containing vaporous material, e.g. the present invention can be employed to produce dried air.

Typical adsorbents and their selectivities are well known in the art and this invention does not reside in the use of any particular absorbent. Absorbents useful include activated carbon, activated alumina, silica gel, coconut shells, zeolites, and other adsorbents which have an affinity for one portion of a gaseous mixture over the remaining portion.

Cycle times can vary, but generally vary from about five to about twenty minutes. Of course, cycle times between about 8 – 12 minutes may also be desirable. Depending upon the gaseous mixture and bed sizes, cycle times less than five minutes or greater than twenty minutes can also be employed.

Pressures used can also vary, but generally the selected relatively high pressure will be from about 150 – 250 psig, and more typically between 175 – 225 psig. Of course, pressures greater than 250 psig and lower than 150 psig may be used to advantage for certain operations. The selected relatively low pressure is typically the lowest pressure that can be achieved with the assurance that leakage into the system will not occur, i.e., the lowest positive pressure achievable. Typical selected lower pressures range from about 1 – 10 psig, but may be higher depending upon the desired products.

The temperatures used are typically ambient temperatures, but it may be desirable from time to time to heat the portion of the primary gaseous product which is used to purge the vessel that has undergone depressurization during the preceding cycle. A typical purge gas temperature increase of 1° – 5° C will assist removal of secondary product remaining in the vessel and can reduce the amount of primary product needed for purge, but for some applications, temperature increases can be as much as 100° C, or higher. It may be advantageous to conduct the operation of the present invention in a manner such that the only transfer of heat to the gaseous mixture or any of the stream occurs from the heat of adsorption within a bed.

The depressurization step lasts essentially throughout the cycle period so as to avoid upset of the absorbent bed and thus assure maximum efficiency in removal of adsorbed secondary product. The gradual release of pressure from the selected relatively high pressure to the selected relatively low pressure thus avoids bed shock and can increase product recovery.

The purge step also lasts essentially throughout the cycle period and occurs at the selected low pressure to insure maximum efficiency in utilization of primary product. It is desirable to purge at this low pressure to capitalize upon the greater volume of gas attained. Of course, this step necessitates pressure reduction of the stream coming from the bed in adsorption which is used for purge since the primary product stream leaving the bed on adsorption is at the selected relatively high pressure. This step can, of course, be accomplished by known means, e.g. a pressure reducing valve not shown on FIG. 1.

DESCRIPTION OF SPECIFIC EMBODIMENTS

As an example of a specific application of the present invention, a gaseous mixture having a composition as follows:

| Component | Volume Percent |
|---|---|
| Hydrogen | 70 |
| Carbon Dioxide | 12 |
| Carbon Monoxide | 12 |
| Methane | 5 |
| Nitrogen | 1 | is continuously separated into a primary gaseous product stream containing 99.999 + % hydrogen, by volume, and a secondary gaseous product stream containing the remainder of the gaseous mixture. The absorbent in each of the four beds comprises equal volumes of activated carbon and molecular sieve Type A and approximately 70 percent, by volume, of the hydrogen contained in the gaseous mixture is continuously recovered. Ambient temperatures are used, cycle times of ten minutes are employed, the selected relatively high pressure is 200 psig and the selected relatively low pressure is 2 psig.

We claim:

1. A continuous process for separating a gaseous mixture into a primary gaseous product stream and a secondary gaseous product stream utilizing four adsorbent-containing beds, each of which is preferentially selective for said secondary product and each of which has a first end and a second end, said process comprising the following steps (a) through (d) which are performed simultaneously during a cycle period, said steps being shifted and repeated during each successive cycle period so that the bed which completes step (a) during a particular cycle period will complete step (b) during the next cycle period, the bed which completes step (b) during a particular cycle period will complete step (c) during the next cycle period, the bed which completes step (c) during a particular cycle period will complete step (d) during the next cycle period, and the bed which completes step (d) during a particular cycle period will complete step (a) during the next cycle period, said steps (a) through (d) being thereby repeated during successive cycle periods and being as follows during a particular cycle period:

a. at the start of a cycle period, flowing said gaseous mixture at a selected relatively high pressure through a first adsorbent-containing bed, which bed has during the preceding cycle period completed step (d) below, from the first end to the second end thereof whereby as the cycle period continues the secondary product is retained within said first bed and the primary product is discharged from the second end of said first bed and then terminating the flow of said gaseous mixture at the end of the cycle period; and b. at the start of a cycle period, releasing the pressure on the first end of a second adsorbent-containing bed, which bed has during the preceding cycle period completed step (a) above, in a manner such that the selected relatively high pressure is gradually released throughout the cycle period to a selected relatively low pressure and whereby most of the secondary gaseous product retained in said second bed is discharged from the first end of said second bed; and c. at the start of a cycle period, flowing a portion of the primary gaseous product which is discharged from the second end of said first bed directly from said first bed through a third adsorbent-containing bed, which bed has during the preceding cycle period completed step (b) above, at the selected relatively low pressure from the second end to the first end of said third bed and continuing said flow throughout the cycle period whereby substantially all of the secondary gaseous product is removed from said third bed and then terminating said flow at the end of the cycle period; and d. at the start of a cycle period, flowing another portion of the primary gaseous product which is discharged from the second end of said first bed directly from said first bed into the second end of a fourth adsorbent-containing bed, which bed has during the preceding cycle period completed step (c) above, in a manner such that the pressure within said fourth bed is gradually raised throughout the cycle period from the selected relatively low pressure to the selected relatively high pressure and then terminating said flow at the end of the cycle period.

2. A process as defined in claim 1 wherein the portion of the primary gaseous product which is discharged from the first bed and flowed through the third bed is heated between the first and third beds.

3. A process as described in claim 1 wherein the cycle time is between about 8 – 12 minutes.

4. A process as described in claim 1 wherein the selected relatively high pressure is between about 150 – 250 psig.

5. A process as described in claim 1 wherein the gaseous mixture contains at least sixty percent hydrogen, by volume.

6. A process as described in claim 1 wherein the primary gaseous product is ultra-pure hydrogen.

7. A process as described in claim 1 wherein the absorbent is activated carbon, zeolite or a mixture thereof.

8. A process as described in claim 1 wherein the cycle time is less than about five minutes.

9. A process as described in claim 1 wherein the gaseous mixture is air.

10. A process as described in claim 1 wherein the primary gaseous product is an oxygen-rich stream.

* * * * *